(12) United States Patent
Fujii

(10) Patent No.: US 8,681,384 B2
(45) Date of Patent: Mar. 25, 2014

(54) IMAGE PROCESSING APPARATUS, IMAGE PROCESSING METHOD AND IMAGE PROCESSING PROGRAM

(75) Inventor: Takahiro Fujii, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1204 days.

(21) Appl. No.: 11/019,608

(22) Filed: Dec. 23, 2004

(65) Prior Publication Data

US 2006/0087672 A1    Apr. 27, 2006

(30) Foreign Application Priority Data

Oct. 22, 2004    (JP) ................. 2004-308549

(51) Int. Cl.
H04N 1/407    (2006.01)
H04N 1/40    (2006.01)
G06T 5/00    (2006.01)

(52) U.S. Cl.
USPC ........ 358/3.26; 358/3.28; 358/3.27; 358/518; 358/538; 358/537; 358/448; 358/453; 358/462; 358/464; 358/1.9; 283/902; 399/366

(58) Field of Classification Search
CPC ............ G03G 21/043; H04N 1/00838; H04N 1/00843
USPC ................. 358/1.2, 1.9, 2.1, 3.28, 1.13–1.18; 399/79–81, 366; 283/93, 902, 113; 380/51, 54; 705/57; 382/100
See application file for complete search history.

(56) References Cited

U.S. PATENT DOCUMENTS

| 5,390,003 | A | 2/1995 | Yamaguchi et al. |
| 5,604,596 | A | 2/1997 | Ukai et al. |
| 5,798,844 | A | 8/1998 | Sakano et al. |
| 6,298,150 | B1 | 10/2001 | Sonoda et al. |
| 2003/0095272 | A1* | 5/2003 | Nomizu .................. 358/1.9 |

(Continued)

FOREIGN PATENT DOCUMENTS

| JP | 06-125459 A | 5/1994 |
| JP | 07-036317 A | 2/1995 |

(Continued)

OTHER PUBLICATIONS

A Decision on Refusal dated Aug. 28, 2007 issued in corresponding Japanese Patent Application No. 2004-308549, and translation thereof.

(Continued)

Primary Examiner — Chad Dickerson
(74) Attorney, Agent, or Firm — Buchanan Ingersoll & Rooney PC

(57) ABSTRACT

For image processing for printing an original, first and second ground patterns are generated. The first ground pattern can be recognized with naked eyes in the original but cannot be recognized with naked eyes in a reproduction of the original obtained by an image forming apparatus, while the second ground pattern has a latent image which cannot be recognized in the original but can be recognized in the reproduction of the original. The first ground pattern and the second ground pattern are synthesized, and print data to be printed by the image forming apparatus is created. The print data has an image of the original, and the synthesized first and second ground patterns.

14 Claims, 12 Drawing Sheets

(56) References Cited

U.S. PATENT DOCUMENTS

| | | | |
|---|---|---|---|
| 2003/0142331 A1* | 7/2003 | Tanaka | 358/1.9 |
| 2003/0179412 A1* | 9/2003 | Matsunoshita | 358/3.28 |
| 2004/0184065 A1* | 9/2004 | Guan et al. | 358/1.14 |
| 2004/0252347 A1* | 12/2004 | Hosoya et al. | 358/3.28 |
| 2005/0058476 A1* | 3/2005 | Murakami | 399/366 |
| 2005/0078974 A1* | 4/2005 | Uchida et al. | 399/81 |
| 2005/0088701 A1* | 4/2005 | Uchida et al. | 358/3.28 |

FOREIGN PATENT DOCUMENTS

| | | |
|---|---|---|
| JP | 2001-086330 A | 3/2001 |
| JP | 2001-197297 A | 7/2001 |
| JP | 2001-238075 | 8/2001 |
| JP | 2001238075 A * | 8/2001 |
| JP | 2001-324898 A | 11/2001 |
| JP | 2001324898 A * | 11/2001 |
| JP | 2004-201068 | 7/2004 |
| JP | 2004-201068 A | 7/2004 |

OTHER PUBLICATIONS

Japanese Office Action, with English-language Translation, dated Oct. 24, 2006.

* cited by examiner

BEFORE COPY

AFTER COPY

BEFORE COPY

AFTER COPY

IMAGE PROCESSING APPARATUS, IMAGE PROCESSING METHOD AND IMAGE PROCESSING PROGRAM

This application is based on application No. 2004-308549 filed in Japan, the contents of which are hereby incorporated by reference.

BACKGROUND OF THE INVENTION

1. Field of the Invention

The present invention relates to image processing which can prevent illegal copy of a document whose reproduction is prohibited such as a confidential document or leakage thereof to the outside.

2. Description of the Background Art

Recently, electrophotographic copying machines have been spread widely, and characters or an image printed on a sheet of paper or the like can easily be copied by any person by using such a copying machine. Image processing technology and image forming technology are also improved significantly. Then, especially, by using a state of the art digital color copying machine (MFP), a copy difficult to be distinguished from an original can be created easily.

As explained above, when an important document or a confidential document which has to be prohibited from being duplicated is copied, a copy which is almost the same as the original (document) can be produced. Therefore, it is a problem that an original copied illegally is leaked to the outside of a company or the like. Then, it is an important element for a copying machine or the like to provide measures for preventing forgery, falsification and illegal copying of a printed material such as an important document. In some methods proposed as the measures therefor (for example, Japanese Patent laid open Publications Nos. 6-125459/1994, 2001-86330, and 7-36317/1995), characteristics which would be included in an original to indicate that it is a duplication prohibited document have been registered. When a copy of an original is produced, a characteristic extracted from an input image is compared with each of the registered characteristics, and when one of the characteristics is found, it is determined that the original should not be reproduced. Thus, a copy of an original including such a characteristic is prevented.

However, in the conventional technique using registered characteristics, it is necessary to previously register all of the characteristics of originals or documents which should be prohibited from being duplicated. Therefore, it can only be applied to certain limited documents. Further, because a device for identifying the characteristics by comparison has to be incorporated, a complex technique has to be incorporated. In addition, if a copying machine does not incorporate the technique, it outputs a copy which cannot be distinguished from the original.

It is also proposed to include a latent image in a document prohibited from being duplicated (for example, Japanese Patent laid open Publications Nos. 2001-197297 and 2004-201068). When the document is copied, a latent image which cannot be recognized with naked eyes in the document becomes visible in the copy so as not to output the same copy as the original (document). Thus, illegal copying can be psychologically prevented.

Though this technique can be applied to a general copying machine, a copy itself is output. Therefore, though the latent image is visualized, the psychological effect to restrain illegal copying is small if only the visualization of the latent image is used.

SUMMARY OF THE INVENTION

It is an object of the present invention to provide more effective measures for preventing forgery, falsification and illegal copying of an original.

For image processing for printing an original, first and second ground patterns are generated. The first ground pattern can be recognized with naked eyes in the original but cannot be recognized with naked eyes in a reproduction of the original obtained by an image forming apparatus, while the second ground pattern has a latent image which cannot be recognized with naked eyes in the original but can be recognized with naked eyes in the copy of the original. The first and second ground patterns are synthesized, and print data to be printed by the image forming apparatus is created. The print data has an image of the original, and the synthesized first and second ground patterns.

It is an advantage of the invention that a difference between an original and its copy becomes more apparent and more visual than an original including a conventional ground pattern.

BRIEF DESCRIPTION OF THE DRAWINGS

These and other objects and features of the present invention will become clear from the following description taken in conjunction with the preferred embodiments thereof with reference to the accompanying drawings, and in which.

DESCRIPTION OF THE PREFERRED EMBODIMENTS

Figure 1:
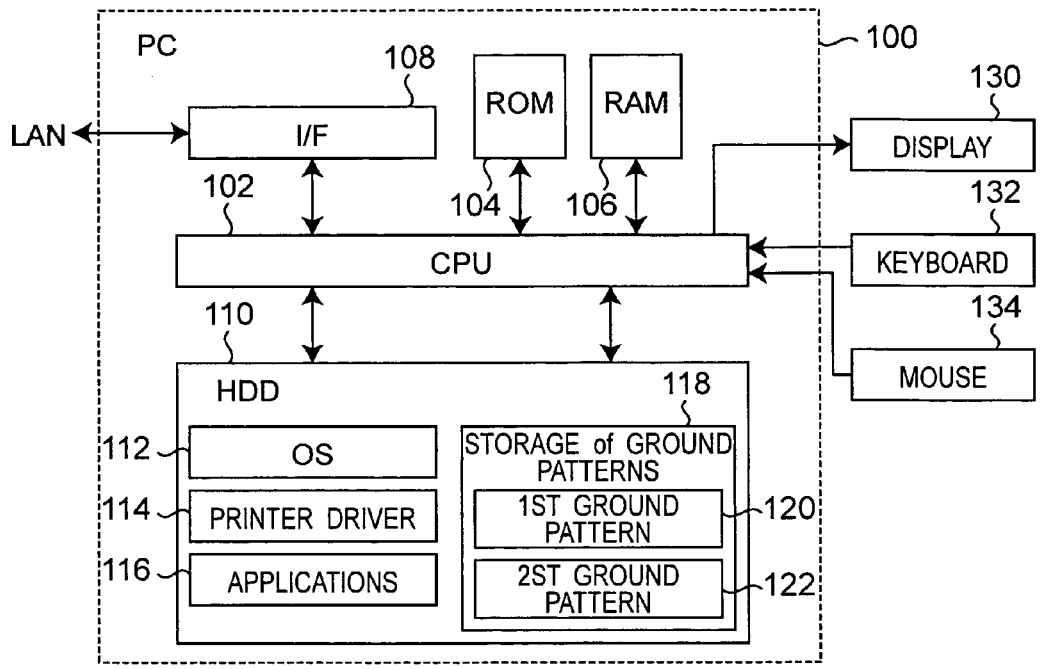
FIG. 1 is a block diagram of a client computer.

Referring now to the drawings, wherein like reference characters designate like or corresponding parts throughout the several views, embodiments of the present invention will be described below.

In a system of an embodiment according to the present invention, a client computer and a multi-functional peripheral (MFP) (or a copying machine) are connected through a network such as a local area network. A client computer 10 is, for example, a personal computer, which comprises a main body 100, a display device 130, a keyboard 132 and a mouse 134. The main body 100 has a central processing unit (CPU) 102 which controls the entire apparatus, a read-only memory (ROM) 104 for storing programs or data, a random access memory (RAM) 106 used as a work area, a network interface 108 connected to the network, and a hard disk drive 110. In the hard disk drive 110, an operating system 112, a printer driver 114 for controlling a printer connected to the computer, and application software programs 116 for creating documents are installed. In addition, a first ground pattern 120 generated by a user and a second ground pattern 122 generated by a user are stored in a ground pattern storing portion 118.

Figure 2:
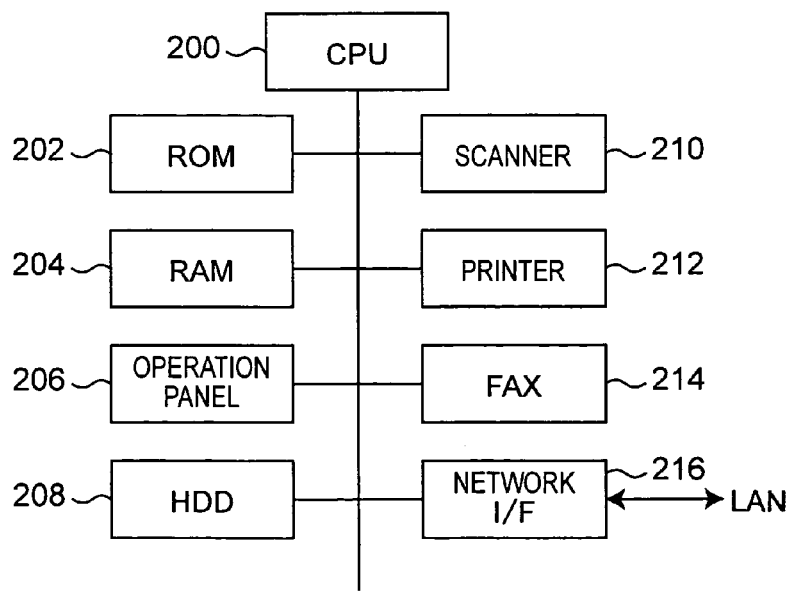
FIG. 2 is a block diagram of a multi-functional peripheral.

FIG. 2 shows the MFP which is used an example of an image forming apparatus connected to the client computer through the network. Similarly to the client computer, a read-only memory (ROM) 202, a random access memory (RAM) 204, an operation panel 206, a hard disk device 208, a network interface 216 are connected to a central processing unit (CPU) 200 for controlling the entire MFP. In addition, a scanner 210 for reading an image, a printing unit 212, and a facsimile unit 214 for FAX transmission are connected to the CPU 200.

Figure 3:
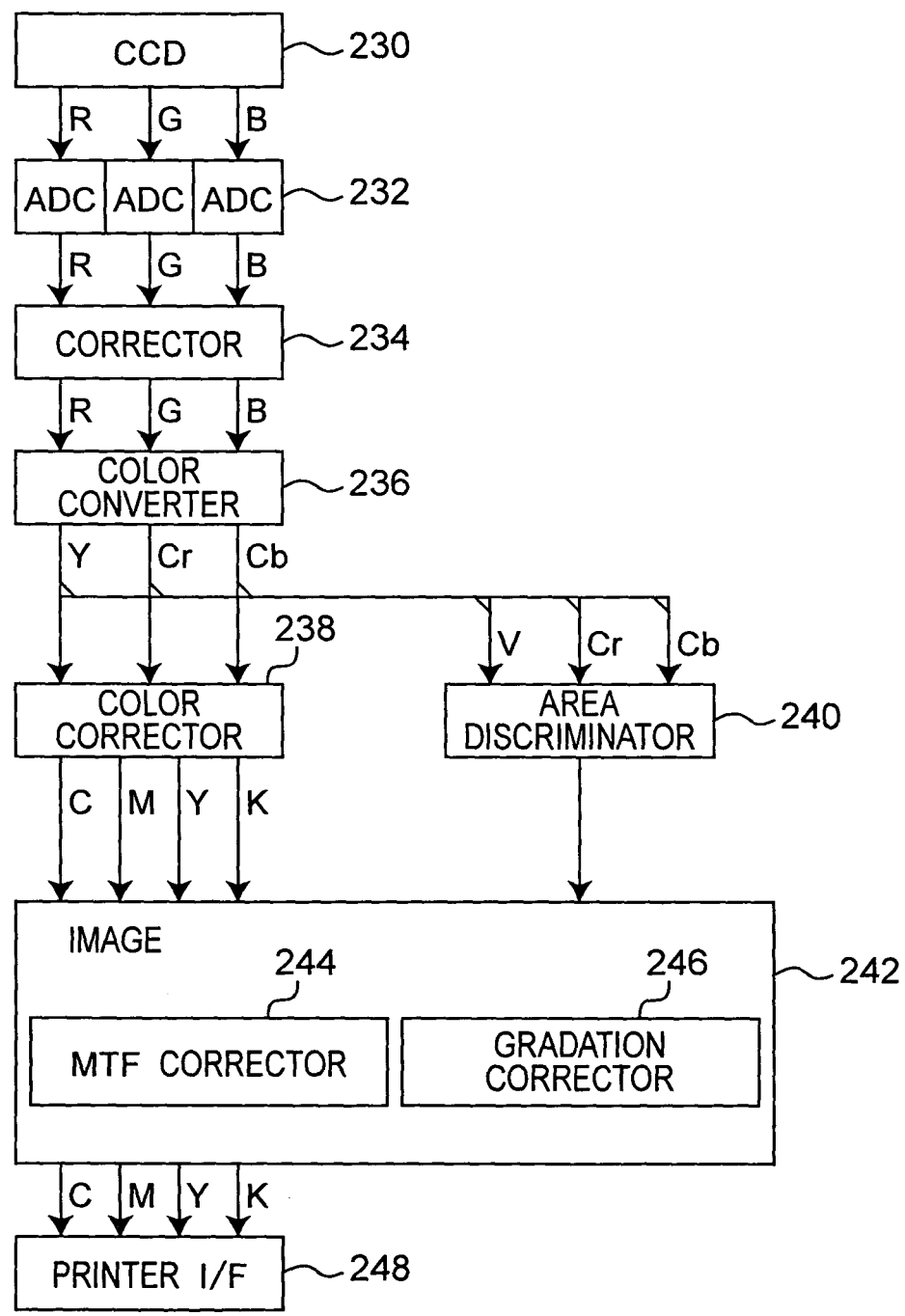
FIG. 3 is a diagram of an image processing block of a scanner.

FIG. 3 shows an image processing block in the scanner 210 of the MFP. In this image processing block, a charge-coupled device (CCD) 230 reads an object image in colors of R, G and B, and an A/D converter 232 converts the read RGB analog image data to digital data. Further, a correction unit 234 performs shading correction, chromatic aberration correction and the like for the digital data R, G and B and if necessary varies the magnification of the image or moves the image. A color converter 236 converts the input image data expressed in RGB color space, to image data expressed in VCrCb color space. Then, a color corrector 238 converts and corrects the image data in the VCrCb color space, to output image data expressed by CMYK color space (CMYK data) required by a printer with a direct mapping process. An area discriminator 240 discriminated an area such as a photograph area, a character area and the like in the image. Then, in an image corrector 242, a MTF corrector 244 performs MTF correction for the CMYK data depending on the region discrimination result by the area discriminator 240, and a gradation corrector 246 performs gradation correction. A printer interface 248 transmits the CMYK data subjected to the MTF correction to the printer 214.

Figure 4:
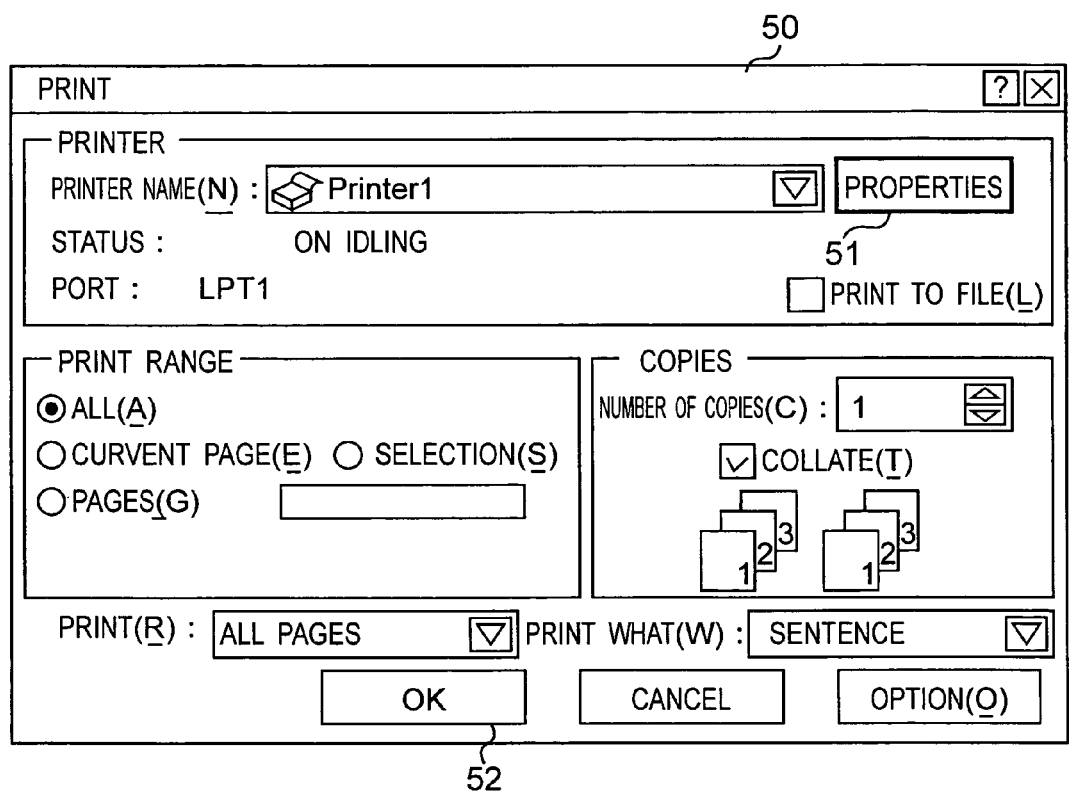
FIG. 4 is a diagram of a print setting screen.
Figure 5:
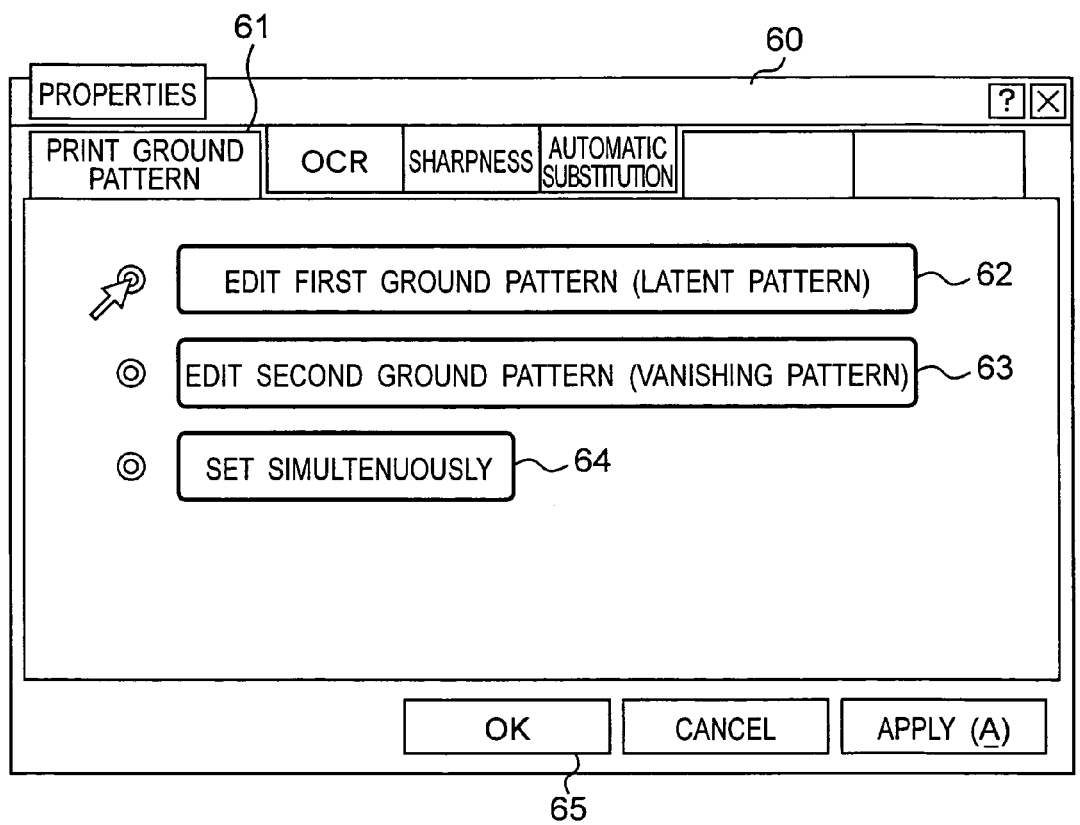
FIG. 5 is a diagram of a screen in which properties of a ground pattern print is set.

When a user of the computer connected to the MFP creates a document or the like by using the application software 116 and instructs its printing, a printing screen 50 as shown in FIG. 4 is displayed in the display device 130. When "properties" button 51 is pressed, a screen 60 as shown in FIG. 5 is displayed. The screen 60 is provided for setting properties for a ground pattern print, wherein the user can edit two kinds of ground patterns. As shown in FIG. 1, the hard disk drive 110 comprises the ground pattern storage portion 118 in which the first and second ground patterns 120 and 122 are stored. The edition of the ground patterns will be described below. When "OK" button 52 is pressed by a mouse or the like in the printing screen 50 shown in FIG. 4, a printing is instructed to the printer, which performs the printing.

Hereinafter the ground pattern edition will be described. In order to prevent forgery, falsification and illegal copying of a printed material such as an important document, it is one of well-known methods to employ a design of the ground such as a ground image, a color pattern or a relief pattern so as to form a geometric pattern mainly. It is also known to print a latent image which cannot be recognized with naked eyes under normal conditions, but can appear by activating some means or an operation for a print. For example, the latent image consists of several kinds of halftone dots having different sizes provided in a part of an original. Further, various kinds of techniques using linear images, dots, wave lines, thin stripes, a tone jump, a moiré pattern and the like are well known in forming a latent image, and an appropriate one among them can be selected. In this embodiment, a first ground pattern, which can be recognized with naked eyes when an original is printed but cannot be recognized with naked eyes in a reproduction of the original, is combined with a second ground pattern having a latent image which cannot be recognized with naked eyes in the original but can be recognized with naked eyes in the reproduction of the original. The first and second patterns are combined or synthesized, and the resultant image is output. When the original is printed, the user can easily recognize it as the original by looking at the first ground pattern with naked eyes. In addition, when a copy of the original is produced, the user can easily recognize it as a reproduction of the original by looking at the image of the second ground pattern which becomes visible.

The above-mentioned image processing block has an image processing function (a function of removing a ground color, for example) in order to prevent undesirable appearance of an image in a back side of an original, colors, a stain and the like on the original in a print of the original. When the first ground pattern is read by the CCD sensor 230, it vanishes in the color data thereof due to the resolution limit of reading or an image processing function such as the function of removing the ground color. Thus, the first ground pattern disappears after it is copied. A ground pattern has a dot pattern added to a ground in a document, in which dots, lines, patterns or the like are repeated. When the size of the dot or the like is smaller than the resolution which can be recognized by the copying machine, the ground pattern disappears after it is copied. Alternatively, information on the ground pattern is stored in the MFP, and the first ground pattern is detected in the read image data and then deleted by using a detection process block for detecting the first ground pattern or a program for ground pattern detection. Similarly, a latent image may be detected in the second ground pattern and it is added to print data.

Next, the resolution limit of the copying machine will be explained with reference to the vanishing effect of the first ground pattern. When the resolution of the copying machine is set at about 10 line/mm, if an original is printed at a resolution higher than that by the copying machine, its reproducibility is considerably deteriorated when the print is scanned. A ground pattern can be constructed to consists of a first pattern or a visible pattern having a resolution higher than that is used and a second pattern or a latent pattern having a resolution lower than that, while keeping color density per unit area the same in both patterns so that they seem to be the same pattern at first sight. When the ground pattern is copied, the first pattern vanishes while the second pattern becomes visible in the reproduction. Needless to say, the same phenomenon can be attained by reversing the resolutions between the first and second patterns. However, in the latter case, a condition has to be satisfied that the printing can be performed with a resolution considerably higher than the resolution of the copying machine.

Figure 6:
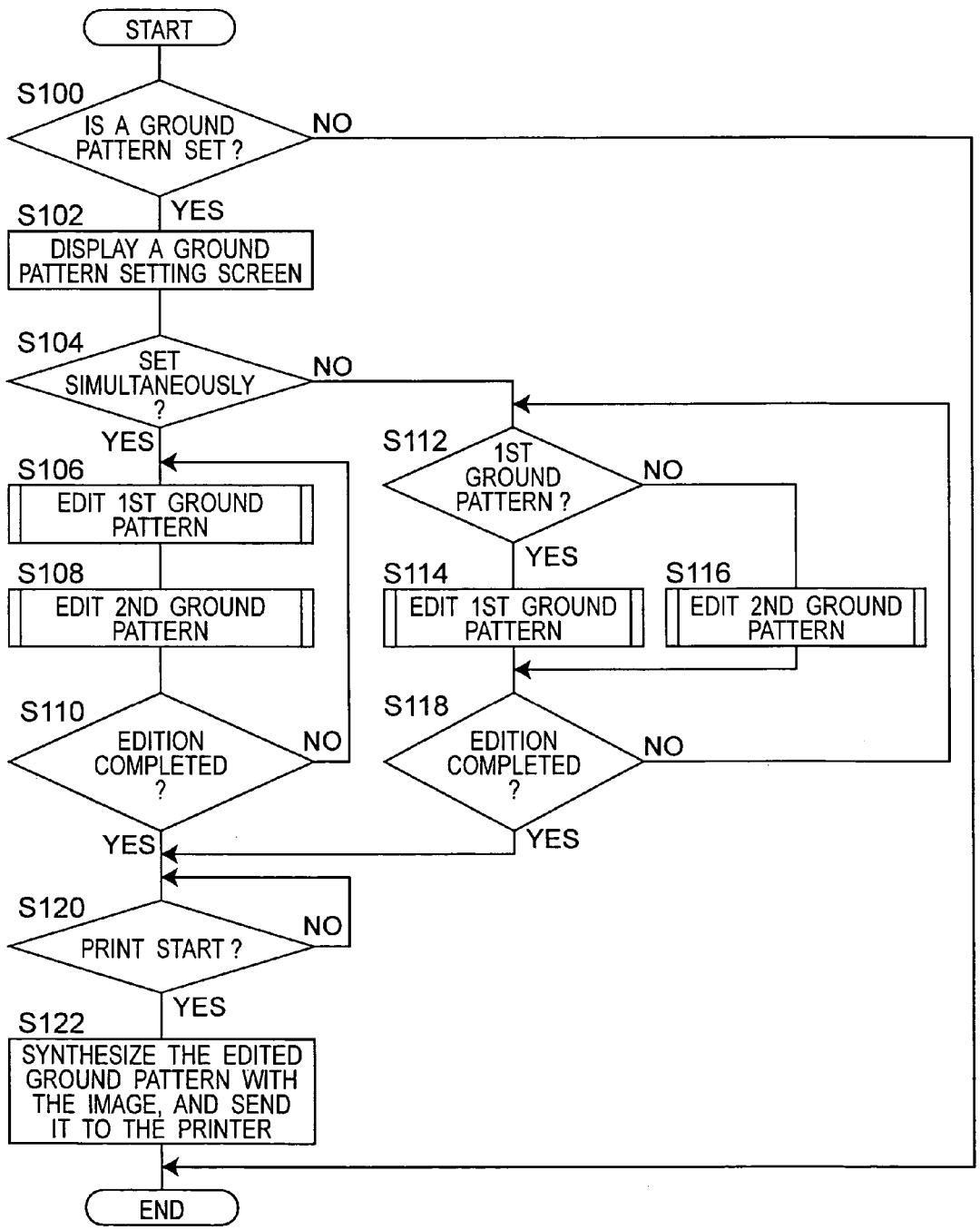
FIG. 6 is a flowchart of ground pattern edition.

FIG. 6 is a flowchart of the ground pattern edition in the printer driver 114. The first ground pattern data 120 and the second ground pattern data 122 have been stored in the ground pattern storage portion 118. When a tab of ground pattern print is selected in the screen shown in FIG. 5 by a user (S100), a ground pattern setting screen is displayed in the display device (S102). When "set simultaneously" button 64 is pressed by the user (YES at S104), the first ground pattern is edited first (S106), and the second ground pattern is edited next (S108). This procedure is repeated until "OK" button 65 is pressed (YES at S110). On the other hand, when "first ground pattern edit" button 62 is pressed by the user (NO at S104 and YES at S112), the first ground pattern is edited (S114), or when "second ground pattern edit" button 63 is pressed by the user (NO at S104 and NO at S112), the second ground pattern is edited (S116). This procedure is repeated until "OK" button 65 is pressed (YES at S118). When the "OK" button 65 is pressed, the ground pattern setting screen shown in FIG. 5 is closed, and the print screen shown in FIG. 4 is displayed. Here, when "OK" button 52 is pressed (YES at S120), the edited ground pattern is synthesized with the contents of an original created by the user, as needed, and it is transmitted to the printer (MFP) (S122). Thus, the original is printed by the printer (MFP).

Figure 7:
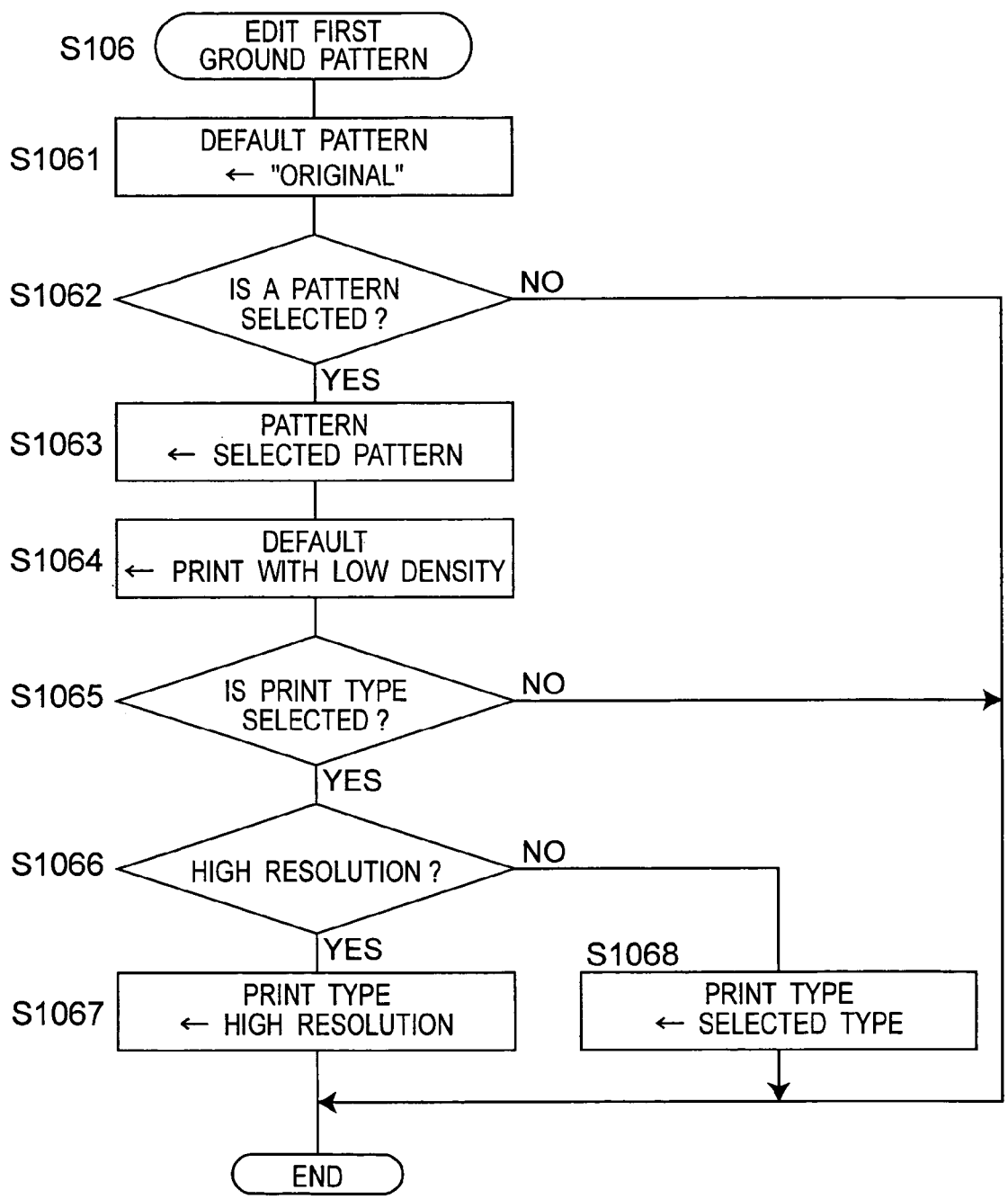
FIG. 7 is a flowchart of edition of a first ground pattern.

FIG. 7 is a flowchart of the first ground pattern edition (S106 and S114 in FIG. 6). First, characters of a word of "ORIGINAL" are selected as a default pattern of the first ground pattern (S1061), and then it is determined whether another pattern is selected by the user or not (S1062). When another pattern is selected by the user, the selected pattern is set as the first ground pattern (S1063). In this example the user selects a pattern in several kinds of patterns previously registered. Alternatively, the user may input any characters. Then, a printing at low density, in which the first ground pattern is deleted by removing the ground color at the time of printing, is set as a default printing type for the first ground pattern (S1064). Then, it is determined whether the user selected another printing type or not (S1065). When it is determined that the selected printing type is high-resolution printing (S1066), the printing type at the resolution higher than read resolution of the scanner 210 is set (S1067), otherwise a selected printing type is set (S1068).

Figure 8:
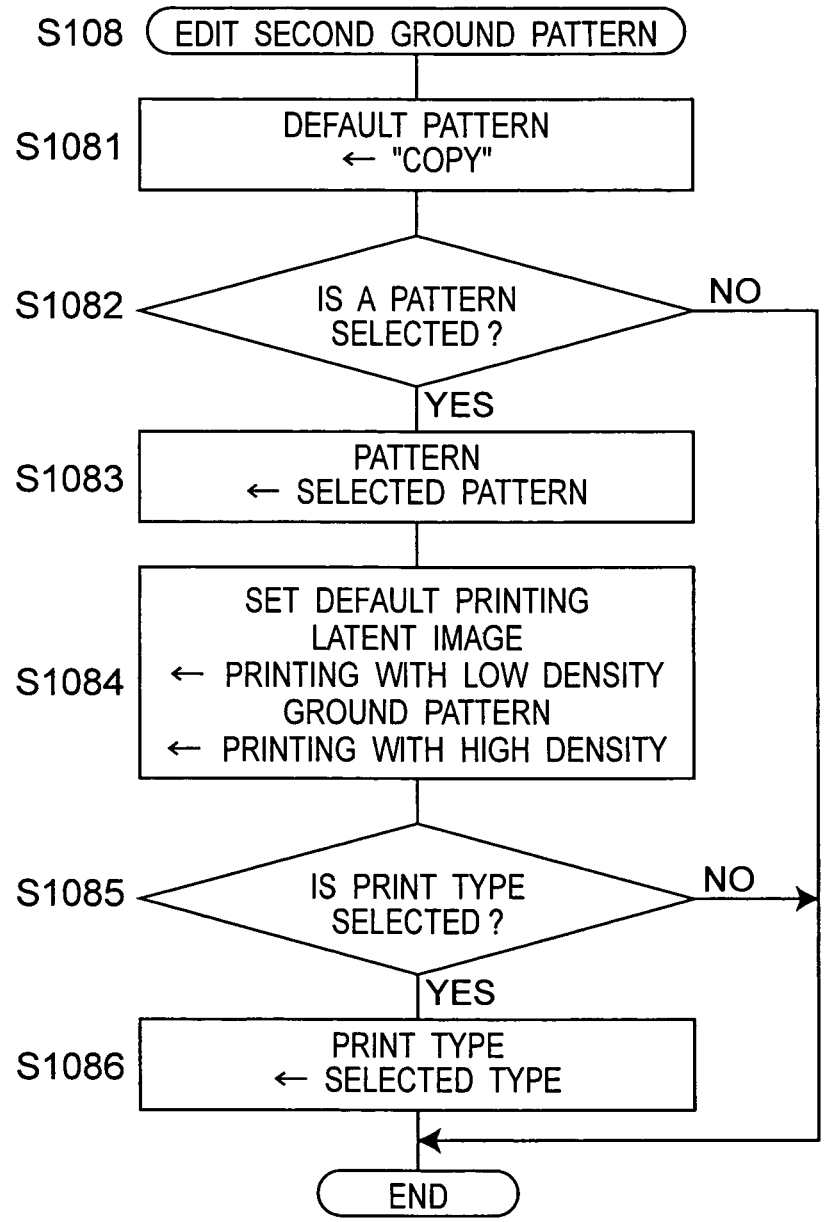
FIG. 8 is a flowchart of edition of a second ground pattern.

FIG. 8 is a flowchart of the second ground pattern edition (S108 and S116 in FIG. 6). First, characters of a word of "COPY" are selected as a default pattern for the second ground pattern (S1081), and it is determined next whether another pattern is selected by the user or not (S1082). When the user selects another pattern, the selected pattern is set (S1083). In this example, the user selects a pattern in several kinds of patterns previously registered. Alternatively, the user may input any characters. Then, as a default print type for the second ground pattern, a resolution lower than the read resolution of the scanner is set to the latent image pattern and the resolution higher than the read resolution thereof is set to the visible ground pattern, while the density is set to the same density level in both latent image and visible pattern (S1084). Thus, when the original is printed and outputted later, since both latent image and visible pattern have the same density level, the latent image is not recognized with naked eye, while since the ground pattern is not read by the scanner when the original is copied later, it vanished so that the latent image becomes visible. Next, it is determined whether the printing type is selected by the user or not (S1085). When a print type is selected by the user, the print type is changed to the selected print type (S1086).

Alternatively, the ground pattern and the original are separately printed on the same sheet of paper. More specifically, the synthesized ground pattern and an original are separately transmitted to the printer. Then, the printer prints the contents described by the user (or a document) on the paper on which the ground pattern has been printed first. In another example, the document data is printed on the paper on which synthesized ground pattern has been printed. Alternatively, the first ground patterns and the second ground patterns are stored in the MFP, and ground patterns may be selected according to a command signal transmitted from the printer driver. The selected patterns are synthesized with the document image data transmitted from the printer driver of the computer, and the synthesized image is printed to output an original.

Figure 10:
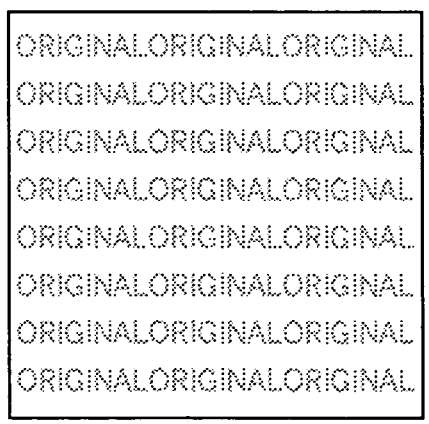
FIG. 10 is a diagram of a first ground pattern included in the original shown in FIG. 9.
Figure 11:
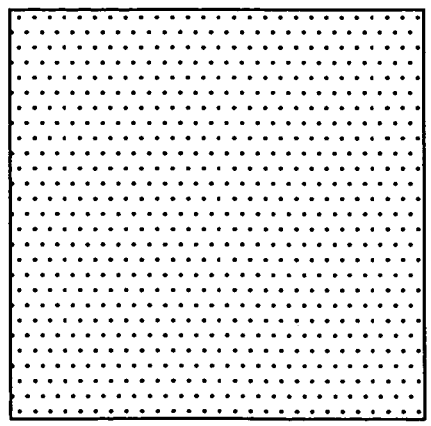
FIG. 11 is a diagram of a second ground pattern included in the original shown in FIG. 9.
Figure 12:
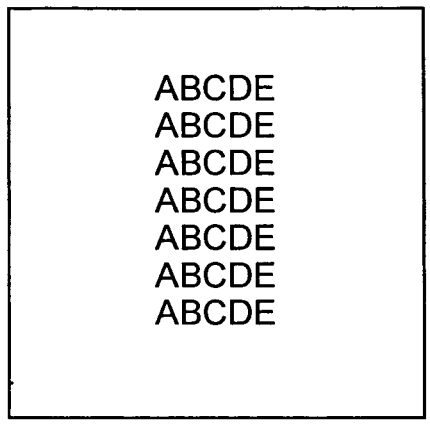
FIG. 12 is a diagram of a document included the original shown in FIG. 9.

Next, an example of the ground pattern synthesis will be described. In an example of an original shown in FIG. 9, a ground pattern in the original consists of a first ground pattern (FIG. 10) which will disappear when it is copied, and a second ground pattern (FIG. 11) in which a latent image is not recognized with naked eyes in the original but will become visible when it is copied. The first ground pattern shown in FIG. 10 is a pattern comprising characters of "ORIGINAL" repeated periodically, for example, and the user can easily recognize by looking at the first ground pattern that a document including the first ground pattern is an original. The second ground pattern shown in FIG. 11 includes characters of "COPY" as a latent image. Alternatively, the latent image may be different characters or a graphic, such as characters of "COPY", "PROHIBIT COPYING" or the like or a writer's name, which shows that the print is a reproduction of an original. FIG. 12 is an example of contents (characters, a photograph and the like) described by a user to be included in the original. The original shown in FIG. 9 is created by printing these separately or simultaneously on a sheet of paper.

Figure 9:
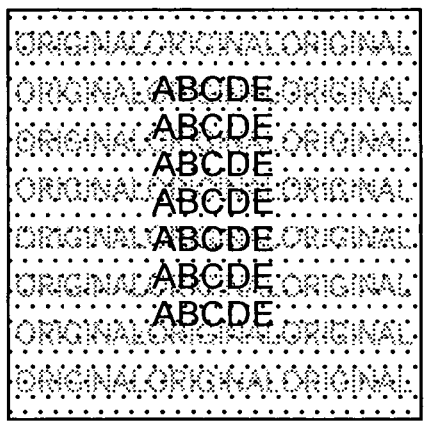
FIG. 9 is a diagram of an example of an original.
Figure 13:
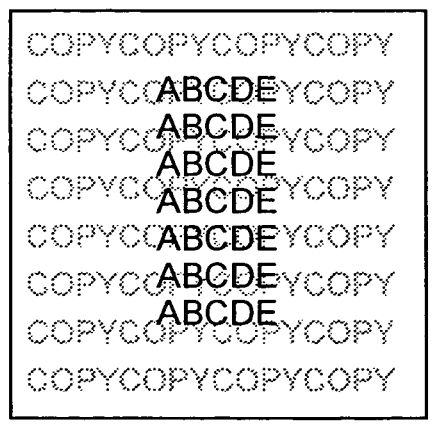
FIG. 13 is a diagram of a copy of the original shown in FIG. 9.
Figure 14A:
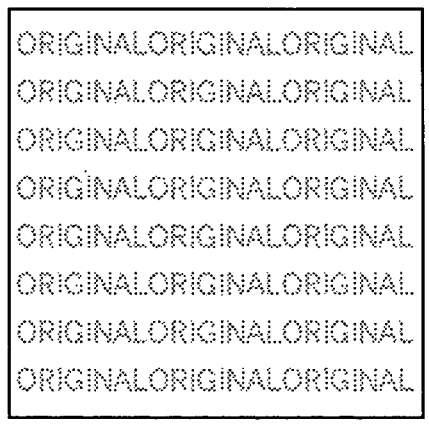
FIG. 14 is a diagram of situations before and after copying of the first ground pattern.
Figure 14B:
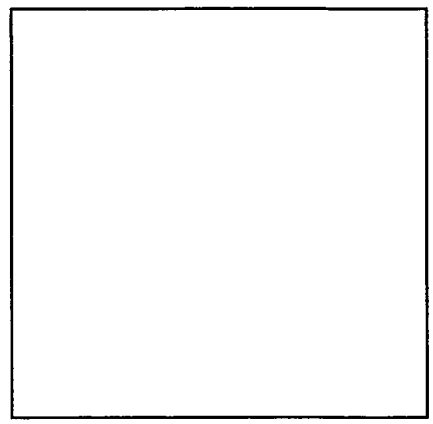
Figure 15A:
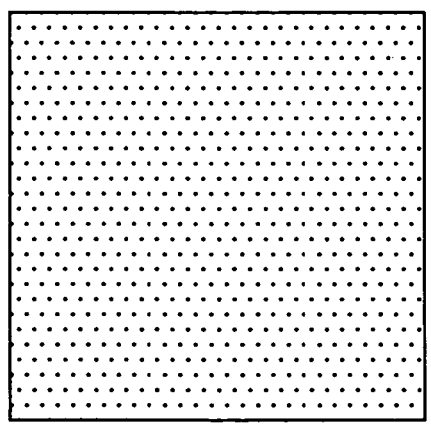
FIG. 15 is a diagram of situations before and after copying of the second ground pattern.
Figure 15B:
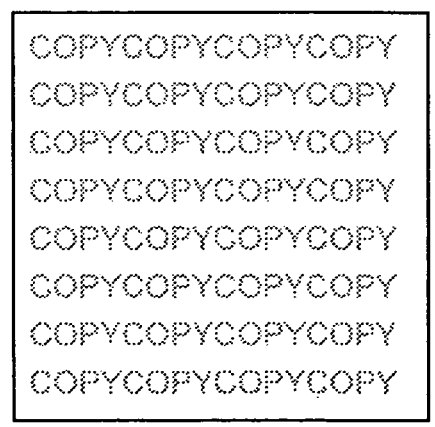

FIG. 13 shows a reproduction obtained by copying the original shown in FIG. 9 with a copying machine. The first ground pattern shown in FIG. 10 disappears, and it is not recognized with naked eyes when the original is copied as shown in FIG. 14. Further, although the second ground pattern shown in FIG. 11 is not recognized with naked eyes in the original (FIG. 9), when the original is copied, the characters of "COPY" of the second ground pattern become visible, and a person can easily recognize them. Therefore, a person can easily recognize that it is not the original, by looking at the reproduction.

Figure 16:
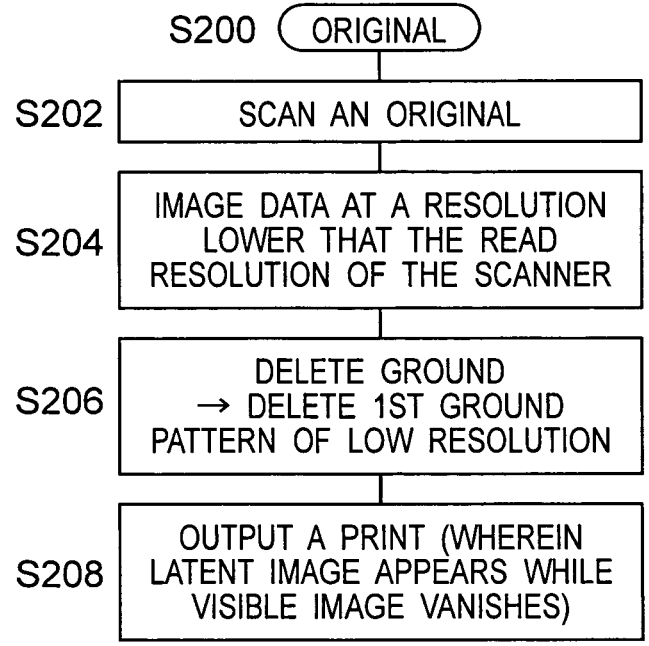
FIG. 16 is a flowchart of copying of an original.

FIG. 16 shows a flow when the original is copied with the copying machine (MFP). When a copy operation of an original is started (S200), the original put on the scanner 210 is scanned (S202). In image data of the original obtained by the scan, the second ground pattern having a high resolution (ground pattern) is deleted in the image data having a resolution not higher than the reading resolution of the scanner (S204). When this image data is sent to the printer 212, print data is created based on the image data in the image processing block of the printer 212. At this time, the first ground pattern having a low resolution is deleted in a background removing process (S206). Then, the processed print data is printed on a sheet of paper (S208). As a result, the first ground pattern which can be recognized by a person in the original vanishes when the original is copied. On the other hand, although the second ground pattern is not recognized by the user, but when the original is printed, its latent image becomes visible.

Figure 17:
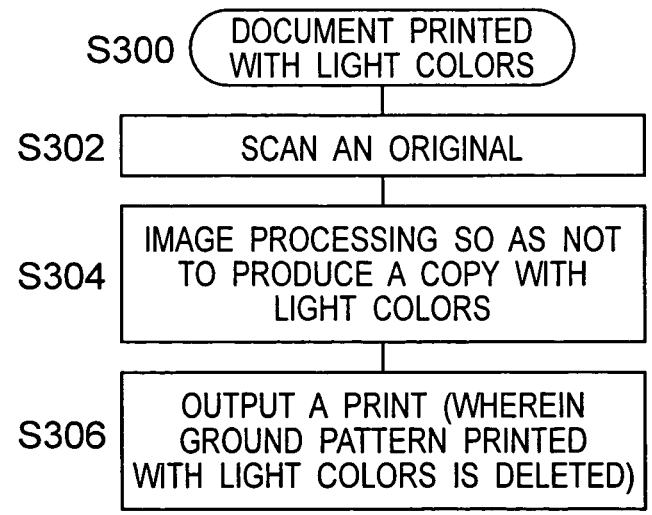
FIG. 17 is a flowchart of copying of an original having light color.

A more visual effect can be provided and deterrence for illegal copy is improved when color information or gradation information is used as an above-mentioned first ground pattern which can be recognized with naked eyes when an original with the first ground pattern is printed but disappears when it is copied. FIG. 17 shows a process flow in the image processing block when a first ground pattern included in an original has color characters which are so light in color that they cannot be read by the copying machine or cannot be reproduced accurately. When a copying operation of an original printed with characters of light color is started (S300), an image of the original is read (S302). The image processing block in the printer 212 has an image processing function of removing the ground color to prevent appearance of an image in the back side, appearance of a color of the original, a stain and the like. This image processing function is performed on the read image data (S304). Then, the processed image data is copied (S306). As a result, the ground pattern printed in light color disappears in a copy of the original obtained by the printing.

Since there is a difference between a color space which can be reproduced by the printer and a color space which can be read by the copying machine, a copy of an original obtained by printing becomes apparently different from the original if colors which cannot be reproduced by the copying machine are printed in the original. Since the respective color spaces are inherent to the type of the machine generally, the above process can be used when the types of printing machines and copying machines can be limited to some extent.

Figure 18:
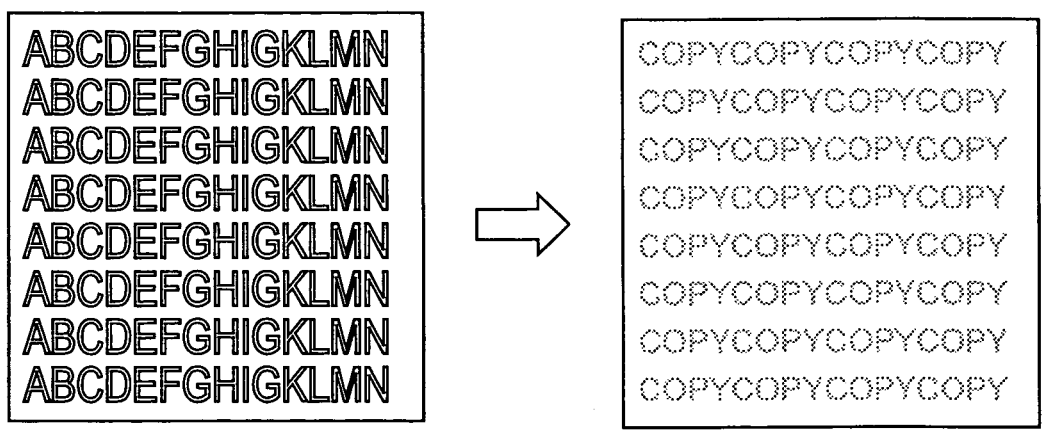
FIG. 18 is a diagram of an example when characters are formed with the second ground pattern.

In an example shown in FIG. 18, an original includes characters, signs or the like formed in a second ground pattern which cannot be seen with naked eyes when the original is printed but can be seen when it is copied. That is, the second ground pattern is not printed on the entire surface of the paper, but it is created so as to form the characters, the signs and the like. As a result, the characters, the signs and the like formed in the original disappear and a latent image appears in a copy of the original.

Next, an example in which a latent image has a meaning to protect information will be shown. A first ground pattern, which can be recognized with naked eyes when printed but cannot be recognized when copied as shown in FIG. 9, is used to describe important information in an original. Therefore, since the information is not contained in a copy of the original, the information cannot be leaked.

Needless to say, the above-mentioned copy preventing function, in which the latent image (ground pattern) becomes visible when an original is copied and it can be easily recognized as the copy of the original, can be applied to a printing where data read by a scanner is printed by a printer, besides the copying with use of a copying machine.

The above-mentioned embodiments have following advantages.

By using a simple processing to use two types of ground patterns, the first and second ground patterns, a difference between an original and its copy becomes more apparent and more visual than an original including a conventional ground pattern. Thus, deterrence for illegal copy is enhanced. A conventional copying machine can be used without an exclusive ink and paper.

When color or gradation information is used for the first ground pattern which is visible in an original with naked eyes but becomes invisible in a copy thereof with naked eyes, visual effect is enhanced more.

Because an original includes a first ground pattern which is visible in an original with naked eyes but becomes invisible in a copy thereof with naked eyes, information can be dropped in the copy in order to limit or protect the information reproduced in the copy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus, comprising:
a first generating device which generates a first ground pattern comprising a vanishing image which can be perceived with naked eyes in an original but no portion of which can be perceived with naked eyes in a reproduction of the original to be obtained by an image forming apparatus;
a second generating device which generates a second ground pattern comprising a latent image no portion of which can be perceived with naked eyes in the original but which can be perceived with naked eyes in the reproduction of the original, wherein a resolution lower than the read resolution is set to the latent image, and wherein the second ground pattern further includes a second visible pattern of a resolution higher than the read resolution;
a synthesizer which synthesizes the first ground pattern and the second ground pattern, wherein the first ground pattern overlaps at least a portion, but not all, of the second ground pattern and the second ground pattern overlaps at least a portion, but not all, of the first ground pattern in a synthesized image; and
a print data creator which creates print data for the image forming apparatus, the print data comprising an image of the original, the first ground pattern and the second ground pattern synthesized by said synthesizer into a single image for a page of a print data original,
wherein the image forming apparatus has a ground color removal function, and a color in the first ground pattern is a around color to be removed by the ground color removal function, whereby the first ground pattern is caused to vanish in the reproduction of the print data original not completely due to the resolution limit of the image forming apparatus but by the function of removing the ground color to prevent appearance of an image composed of the ground color in the back side of the print data original, a color or a stain composed of the ground color in the print data original.

2. An image processing method for printing an original, comprising:
generating a first ground pattern comprising a vanishing image which can be perceived with naked eyes in the original but no portion of which can be perceived with naked eyes in a reproduction of the original obtained by an image forming apparatus;
generating a second ground pattern comprising a latent image no portion of which can be perceived with naked eyes in the original but which can be perceived with naked eyes in the reproduction of the original, wherein a resolution lower than the read resolution is set to the latent image, and wherein the second ground pattern further includes a second visible pattern of a resolution higher than the read resolution;
synthesizing the first ground pattern and the second ground pattern, wherein the first ground pattern overlaps at least a portion, but not all, of the second ground pattern and the second ground pattern overlaps at least a portion, but not all, of the first ground pattern in a synthesized image; and
creating print data to be printed by the image forming apparatus, the print data comprising an image of the original, and the synthesized first and second ground patterns synthesized into a single image for a page of a print data original,
wherein the image forming apparatus has a ground color removal function, and a color in the first ground pattern is a around color to be removed by the ground color removal function, whereby the first ground pattern is caused to vanish in the reproduction of the print data original not completely due to the resolution limit of the image forming apparatus but by the function of removing the ground color to prevent appearance of an image composed of the ground color in the back side of the print data original, a color or a stain composed of the ground color in the print data original.

3. A non-transitory computer readable medium that contains an image processing program executable by an image processing apparatus to be connected to an image forming apparatus, the program comprising the steps of:

generating a first ground pattern comprising a vanishing image which can be perceived with naked eyes in the original but no portion of which can be perceived with naked eyes in a reproduction of the original to be obtained by the image forming apparatus;

generating a second ground pattern comprising a latent image no portion of which can be perceived with naked eyes in the original but which can be perceived with naked eyes in the reproduction of the original, wherein a resolution lower than the read resolution is set to the latent image, and wherein the second ground pattern further includes a second visible pattern of a resolution higher than the read resolution;

synthesizing the first ground pattern and the second ground pattern, wherein the first ground pattern overlaps at least a portion, but not all, of the second ground pattern and the second ground pattern overlaps at least a portion, but not all, of the first ground pattern in a synthesized image; and creating print data to be printed by the image forming apparatus, the print data comprising an image of the original and the synthesized first and second ground patterns synthesized into a single image for a page of a print data original, wherein the image forming apparatus has a ground color removal function, and a color in the first ground pattern is a ground color to be removed by the ground color removal function, whereby the first ground pattern is caused to vanish in the reproduction of the print data original not completely due to the resolution limit of the image forming apparatus but by the function of removing the ground color to prevent appearance of an image composed of the ground color in the back side of the print data original, a color or a stain composed of the ground color in the print data original.

4. The image processing apparatus according to claim 1, wherein said first generating device comprises a first storage device which stores the first ground pattern, and said second generating device comprises a second storage device which stores the second ground pattern.

5. The image processing apparatus according to claim 1, further comprising an editor which edits the first ground pattern or the second ground pattern.

6. The image processing apparatus according to claim 1, wherein the first ground pattern and the second ground pattern are synthesized in patterns different from each other.

7. The image processing apparatus according to claim 1, wherein the first ground pattern comprises a color information pattern different from the original image.

8. The image processing apparatus according to claim 1, wherein the second ground pattern forms a pattern of a character or a sign.

9. The image processing method according to claim 2, further comprising:
storing the first ground pattern in a first storage device; and
storing the second ground pattern in a second storage device.

10. The image processing method according to claim 2, further comprising editing the first ground pattern or the second ground pattern, and synthesizing the first ground pattern and the second ground pattern after the edition.

11. The image processing method according to claim 2, wherein the first ground pattern and the second ground pattern are synthesized in different patterns.

12. The non-transitory computer readable medium according to claim 3, further comprising:
storing the first ground pattern in a first storage device; and
storing the second ground pattern in a second storage device.

13. The non-transitory computer readable medium according to claim 3, further comprising the steps of:
editing the first ground pattern or the second ground pattern, and
synthesizing the first ground pattern and the second ground pattern after the edition.

14. The non-transitory computer readable medium according to claim 3, wherein the first ground pattern and the second ground pattern are synthesized in different patterns.

* * * * *

UNITED STATES PATENT AND TRADEMARK OFFICE
CERTIFICATE OF CORRECTION

PATENT NO. : 8,681,384 B2  
APPLICATION NO. : 11/019608  
DATED : March 25, 2014  
INVENTOR(S) : Takahiro Fujii It is certified that error appears in the above-identified patent and that said Letters Patent is hereby corrected as shown below:

In the Claims

Please amend claims 1 and 2 as follows:

Column 8, lines 2-39, claim 1 should read as follows:

1. An image processing apparatus, comprising:

a first generating device which generates a first ground pattern comprising a vanishing image which can be perceived with naked eyes in an original but no portion of which can be perceived with naked eyes in a reproduction of the original to be obtained by an image forming apparatus;

a second generating device which generates a second ground pattern comprising a latent image no portion of which can be perceived with naked eyes in the original but which can be perceived with naked eyes in the reproduction of the original, wherein a resolution lower than the read resolution is set to the latent image, and wherein the second ground pattern further includes a second visible pattern of a resolution higher than the read resolution;

a synthesizer which synthesizes the first ground pattern and the second ground pattern, wherein the first ground pattern overlaps at least a portion, but not all, of the second ground pattern and the second ground pattern overlaps at least a portion, but not all, of the first ground pattern in a synthesized image; and a print data creator which creates print data for the image forming apparatus, the print data comprising an image of the original, the first ground pattern and the second ground pattern synthesized by said synthesizer into a single image for a page of a print data original, Signed and Sealed this  
Twenty-third Day of December, 2014

Michelle K. Lee  
*Deputy Director of the United States Patent and Trademark Office* wherein the image forming apparatus has a ground color removal function, and a color in the first ground pattern is a ground color to be removed by the ground color removal function, whereby the first ground pattern is caused to vanish in the reproduction of the print data original not completely due to the resolution limit of the image forming apparatus but by the function of removing the ground color to prevent appearance of an image composed of the ground color in the back side of the print data original, a color or a stain composed of the ground color in the print data original.

Column 8, lines 40-65 - Column 9, lines 1-9, claim 2 should read as follows:

2. An image processing method for printing an original, comprising:

generating a first ground pattern comprising a vanishing image which can be perceived with naked eyes in the original but no portion of which can be perceived with naked eyes in a reproduction of the original obtained by an image forming apparatus;

generating a second ground pattern comprising a latent image no portion of which can be perceived with naked eyes in the original but which can be perceived with naked eyes in the reproduction of the original, wherein a resolution lower than the read resolution is set to the latent image, and wherein the second ground pattern further includes a second visible pattern of a resolution higher than the read resolution;

synthesizing the first ground pattern and the second ground pattern, wherein the first ground pattern overlaps at least a portion, but not all, of the second ground pattern and the second ground pattern overlaps at least a portion, but not all, of the first ground pattern in a synthesized image; and creating print data to be printed by the image forming apparatus, the print data comprising an image of the original, and the synthesized first and second ground patterns synthesized into a single image for a page of a print data original, wherein the image forming apparatus has a ground color removal function, and a color in the first ground pattern is a ground color to be removed by the ground color removal function, whereby the first ground pattern is caused to vanish in the reproduction of the print data original not completely due to the resolution limit of the image forming apparatus but by the function of removing the ground color to prevent appearance of an image composed of the ground color in the back side of the print data original, a color or a stain composed of the ground color in the print data original.